(12) United States Patent
Stern

(10) Patent No.: US 11,772,013 B2
(45) Date of Patent: Oct. 3, 2023

(54) TAMPER-PROOF SINGLE PIECE FLUID SEDIMENT TRAP

(71) Applicant: Safe 'N' Sound Appliances Inc., Westbury, NY (US)

(72) Inventor: Jordan Stern, Westbury, NY (US)

(73) Assignee: Safe 'N' Sound Appliances Inc., Westbury, NY (US)

( * ) Notice: Subject to any disclaimer, the term of this patent is extended or adjusted under 35 U.S.C. 154(b) by 3 days.

(21) Appl. No.: 17/398,444

(22) Filed: Aug. 10, 2021

(65) Prior Publication Data

US 2022/0233974 A1    Jul. 28, 2022

Related U.S. Application Data

(60) Provisional application No. 63/142,814, filed on Jan. 28, 2021.

(51) Int. Cl.
| | | |
|---|---|---|
| *B01D 19/00* | (2006.01) | |
| *B01D 21/24* | (2006.01) | |
| *B01D 45/02* | (2006.01) | |
| *F24H 9/00* | (2022.01) | |

(52) U.S. Cl.
CPC ......... *B01D 21/2483* (2013.01); *B01D 19/00* (2013.01); *B01D 45/02* (2013.01); *F24H 9/0042* (2013.01)

(58) Field of Classification Search
CPC .... B01D 21/02; B01D 21/2483; B01D 45/02; B01D 21/34; B01D 19/00; B01D 19/0042; B01D 45/00; B01D 45/08; B01D 45/18; B01D 46/00; B01D 46/003; B01D 49/00; B01D 49/003; F24H 9/0042; F24H 9/16; F24H 9/20; F24H 9/2007; F24D 19/0092; F24D 19/08; F24D 19/10; F24D 19/1003; F24D 19/1006

USPC ........ 210/532.1, 533, 534; 55/428, 434, 435

See application file for complete search history.

(56) References Cited

U.S. PATENT DOCUMENTS

| | | | | |
|---|---|---|---|---|
| 246,453 | A * | 8/1881 | Brandeis | ........................ 210/533 |
| 585,674 | A | 7/1897 | Jones | |
| 661,931 | A * | 11/1900 | Hayes | .................... B01D 35/02 |
| | | | | 210/533 |
| 826,580 | A * | 7/1906 | Keyes | .................... B01D 21/02 |
| | | | | 210/534 |

(Continued)

*Primary Examiner* — Joseph W Drodge
(74) *Attorney, Agent, or Firm* — Carter, DeLuca & Farrell LLP

(57) ABSTRACT

A tamper-proof fluid sediment trap including a central body portion having a central longitudinal axis, an outlet leg portion, a drip leg portion, and a supply leg portion. The outlet leg portion extends upward from the central body portion parallel to the central longitudinal axis and is configured to operably couple to an appliance. The drip leg portion extends downward from the central body portion and defines a shape being resistant to threading or tapping of an outer surface or an inner surface of the drip leg portion. The supply leg portion is configured to couple to a fluid supply line, extends radially outward from the central body portion, between the outlet leg portion and the drip leg portion, and has a central longitudinal axis extending perpendicular to the central longitudinal axis of the central body portion. The portions of the tamper-proof fluid sediment trap are monolithically formed.

18 Claims, 11 Drawing Sheets

(56) References Cited

U.S. PATENT DOCUMENTS

| | | | | |
|---|---|---|---|---|
| 1,173,725 A * | 2/1916 | Ludwig | B01D 35/30 | |
| | | | 210/533 | |
| 1,323,324 A * | 12/1919 | Sauerbrunn | B04C 5/081 | |
| | | | 210/533 | |
| 1,544,950 A * | 7/1925 | Smith | C10K 1/022 | |
| | | | 210/533 | |
| 1,548,855 A * | 8/1925 | Smith | B60K 15/06 | |
| | | | 210/533 | |
| 1,576,687 A * | 3/1926 | Thomas | F24D 19/1003 | |
| | | | 137/203 | |
| 1,803,011 A * | 4/1931 | Fuqua | C02F 1/66 | |
| | | | 210/534 | |
| 1,822,440 A * | 9/1931 | Jacobson | B01D 35/005 | |
| | | | 210/533 | |
| 2,424,548 A * | 7/1947 | Bell | E03C 1/29 | |
| | | | 210/533 | |
| 2,564,963 A * | 8/1951 | Drigenko | B03B 5/60 | |
| | | | 210/534 | |
| 2,593,734 A * | 4/1952 | Davis | E03C 1/284 | |
| | | | 210/533 | |
| 2,656,926 A * | 10/1953 | Garaycochea | B01D 17/0208 | |
| | | | 210/533 | |
| 2,742,106 A | 4/1956 | Resko et al. | | |
| 2,770,362 A * | 11/1956 | Paquin | B01D 35/027 | |
| | | | 210/172.4 | |
| 3,486,771 A | 12/1969 | Conlin | | |
| 4,004,615 A * | 1/1977 | Stern | F16L 57/06 | |
| | | | 55/435 | |
| 4,655,803 A | 4/1987 | Katchka et al. | | |
| 4,726,399 A | 2/1988 | Miller | | |
| 5,266,089 A | 11/1993 | Blocker | | |
| 5,689,938 A | 11/1997 | Lyall et al. | | |
| 9,061,223 B2 | 6/2015 | Winborn | | |
| 2005/0104371 A1 | 5/2005 | Atkinson | | |
| 2018/0209664 A1* | 7/2018 | Heath | F24D 3/1058 | |
| 2019/0170264 A1 | 6/2019 | Roy, Jr. et al. | | |

\* cited by examiner

TAMPER-PROOF SINGLE PIECE FLUID SEDIMENT TRAP

CROSS-REFERENCE TO RELATED APPLICATION

This application claims the benefit of, and priority to, U.S. Provisional Patent Application Ser. No. 63/142,814, filed on Jan. 28, 2021, the entire contents of which are incorporated by reference herein.

FIELD

The present disclosure relates to fluid sediment traps, in particular, untappable tamper-proof and anti-theft of service fluid sediment traps.

BACKGROUND

Gas-fired appliances, such as furnaces, heaters, boilers, and the like, require a gas supply line from the incoming gas supply to fuel the appliance. Connected to the gas lines is an extra leg of piping referred to as a sediment trap. Sediment traps are intentionally installed to prevent sediment, dirt, and/or particulates in the gas or piping, from entering the burner area of the appliance or associated components such as the gas ball valve connected upstream of the appliance. Specifically, a gas sediment trap uses gravity to capture sediment before it travels to the gas-fired appliance. Sediment traps are usually required at all gas appliances as part of the International Fuel Gas Code. The International Fuel Gas Code for the Sediment Trap section 408.4 (2015) states that when a sediment trap is not incorporated as part of the appliance, a sediment trap shall be installed downstream of the appliance shutoff valve as close to the inlet of the appliance as practical. Sediment traps are generally required by code on all furnaces, boilers, and water heaters in all states in the United States.

SUMMARY

Embodiments of the present disclosure are described in detail with reference to the drawings wherein like reference numerals identify similar or identical elements.

An aspect of the present disclosure provides a tamper-proof fluid sediment trap. The tamper-proof sediment trap includes a central body portion having a central longitudinal axis, an outlet leg portion, a drip leg portion, and a supply leg portion. The outlet leg portion extends upward from the central body portion parallel to the central longitudinal axis and is configured to operably couple to an appliance. The drip leg portion extends downward from the central body portion and defines a shape being resistant to threading or tapping of an outer surface or an inner surface of the drip leg portion. The supply leg portion is configured to couple to a fluid supply line, extends radially outward from the central body portion, between the outlet leg portion and the drip leg portion, and has a central longitudinal axis extending perpendicular to the central longitudinal axis of the central body portion. The central body portion, the outlet leg portion, and the drip leg portion are monolithically formed.

In an aspect, the drip leg portion includes a drip outlet for removal of sediment trapped in the drip leg portion. Additionally, or alternatively, the tamper-proof fluid sediment trap may further include at least one of a plug or a cap removably coupled to the drip outlet of the drip leg portion.

In an aspect, the drip leg portion defines an oblique conical shape having an apex being laterally offset from the central longitudinal axis of the central body portion.

In an aspect, a base of the drip leg portion is polygonal.

In an aspect, a base of the drip leg portion is circular.

In an aspect, the inner surface of the drip leg portion is smooth.

In an aspect, the inner surface of the drip leg portion is textured.

In an aspect, the drip leg portion defines an inwardly tapered conical shape.

In an aspect, the drip leg portion defines an outwardly tapered conical shape.

In an aspect, the outer surface of the drip leg portion is spiraled forming a spiraled inwardly tapered profile.

In an aspect, at least one of the outlet leg portion or the supply leg portion includes a female iron pipe (FIP) union for coupling to a pipe nipple or a male flare union for coupling to a fluid hose with a flare connection.

In another aspect of the present disclosure, a tamper-proof fluid sediment trap is provided. The tamper-proof fluid sediment trap includes a central body portion having a central longitudinal axis, an outlet leg portion extending from the central body portion and configured to be operably coupled to an appliance, a drip leg portion extending from the central body portion and defining an inwardly tapered conical shape being resistant to threading or tapping of an outer surface or an inner surface of the drip leg portion, and a supply leg portion extending radially outward from the central body portion, between the outlet leg portion and the drip leg portion, and configured to be operably coupled to a fluid supply line.

In an aspect, the central body portion, the outlet leg portion, and the drip leg portion are monolithically formed.

In an aspect, the inner surface of the drip leg portion is smooth.

In an aspect, the inner surface of the drip leg portion is textured.

In another aspect of the present disclosure, a tamper-proof fluid sediment trap is provided. The tamper-proof fluid sediment trap includes a central body portion having a central longitudinal axis, an outlet leg portion extending from the central body portion and configured to be operably coupled to an appliance, a drip leg portion extending from the central body portion and defining an outwardly tapered conical shape being resistant to threading or tapping of an outer surface or an inner surface of the drip leg portion, and a supply leg portion extending radially outward from the central body portion, between the outlet leg portion and the drip leg portion, and configured to be operably coupled to a fluid supply line.

In an aspect, the central body portion, the outlet leg portion, and the drip leg portion are monolithically formed.

In an aspect, the inner surface of the drip leg portion is smooth.

In an aspect, the inner surface of the drip leg portion is textured.

Further details and aspects of exemplary embodiments of the present disclosure are described in more detail below with reference to the appended figures.

BRIEF DESCRIPTION OF THE DRAWINGS

A better understanding of the features and advantages of the disclosed technology will be obtained by reference to the following detailed description that sets forth illustrative embodiments, in which the principles of the technology are utilized, and the accompanying drawings of which.

Figure 1:
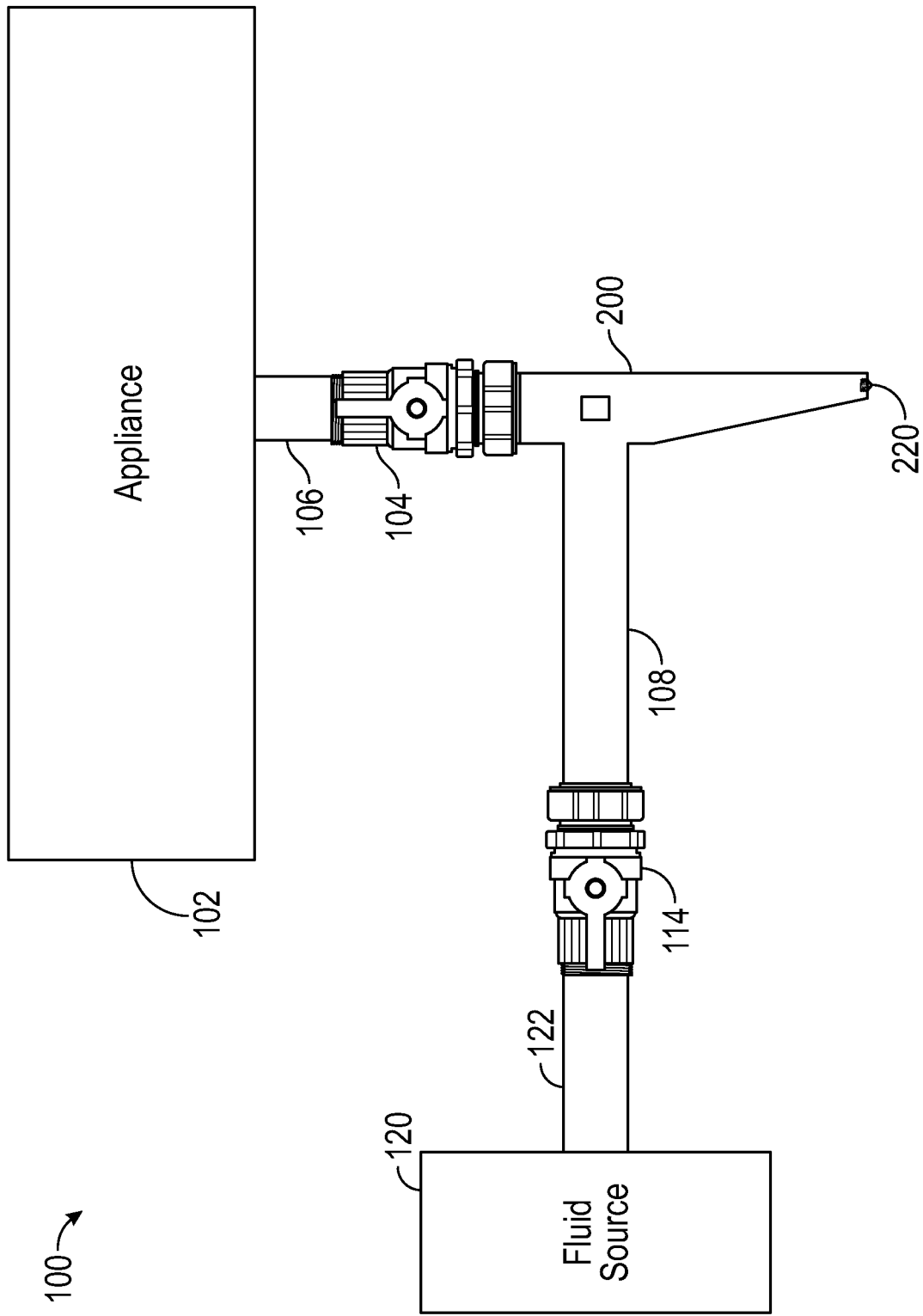
FIG. 1 is a schematic view of an example tamper-proof sediment trap having an offset taper shown in example installations, in accordance with the disclosure.

Further details and aspects of various embodiments of the present disclosure are described in more detail below with reference to the appended figures.

DETAILED DESCRIPTION

This disclosure relates to fluid sediment traps, including non-tappable and anti-theft of service fluid sediment traps. The disclosed tamper-proof sediment trap solves the problem of theft of service caused by a user tapping (e.g., by using a tap and/or die to form threads) and/or disassembling a fluid sediment trap assembly (e.g., at the drip leg of the sediment trap assembly) and connecting another gas-fired appliance, effectively removing the sediment trap from the fluid circuit which can cause sediment to damage the gas-fired appliances and catastrophic appliance failure. As used herein, the term "fluid" includes gas and liquid and the terms "tap" or "thread" and variations thereof are intended to include any means by which two components can be joined together or which access can be made to join one component to another in a fluid circuit.

Although the present disclosure will be described in terms of specific embodiments, it will be readily apparent to those skilled in this art that various modifications, rearrangements, and substitutions may be made without departing from the spirit of the present disclosure. The scope of the present disclosure is defined by the claims appended hereto.

For purposes of promoting an understanding of the principles of the present disclosure, reference will now be made to exemplary embodiments illustrated in the drawings, and specific language will be used to describe the same. It will nevertheless be understood that no limitation of the scope of the present disclosure is thereby intended. Any alterations and further modifications of the inventive features illustrated herein, and any additional applications of the principles of the present disclosure as illustrated herein, which would occur to one skilled in the relevant art and having possession of this disclosure, are to be considered within the scope of the present disclosure.

With reference to FIG. 1, a fluid circuit 100 is shown with an appliance 102 connected to a fluid source 120. Generally, there are several methods for connecting the appliance 102 to the fluid source 120 in the fluid circuit 100.

The fluid circuit 100 includes a shutoff valve 104 (e.g., a manual shutoff valve, ball valve, etc.) connected to an inlet 106 of the appliance 102, downstream of the appliance 102. The tamper-proof sediment trap 200 may be connected downstream of the shutoff valve 104. Another shutoff valve 114 (e.g., a manual shutoff valve, ball valve, etc.) is included in the fluid circuit 100, downstream of the tamper-proof sediment trap 200. Fluid is supplied from the fluid source 120, through the shutoff valve 114 to the tamper-proof sediment trap 200, which is typically vertically mounted, to trap any sediment and debris present in the fluid. The fluid is then supplied to the appliance 102 via the tamper-proof sediment trap 200, which traps sediment present in the supplied fluid, preventing delivery of the sediment in the fluid to the appliance 102. Components, such as ball valves, hoses, fittings, pipe, etc., are certified for use with gas. Any type of connection can be used to couple the ends of tamper-proof sediment trap 200 to a fluid supply line 122 and to the appliance 102. While different embodiments have shown threaded, compression, flare, National Pipe Thread (NPT), Male Iron Pipe (MIP), Female Iron Pipe (FIP), or other types of gas approved conventional connections, it is to be understood that any type of conventional connection that couples two or more components without creating a leak can be utilized.

Referring to FIGS. 2A-2D, the tamper-proof sediment trap 200 of FIG. 1 is shown and will now be described in detail. Tamper-proof sediment trap 200 includes a central body portion 210 defining a central longitudinal axis "L", a supply leg portion 220, an outlet leg portion 230, and a drip leg portion 250. The central body portion 210, supply leg portion 220, and outlet leg portion 230 are generally cylindrical in shape and cooperatively define (along with the drip leg portion 250) a lumen 202 configured to enable fluid to flow in from the supply leg portion 220, through the central body portion 210, and out from the outlet leg portion 230 (e.g., to a connected appliance), while trapping sediment in the drip leg portion 250. The supply leg portion 220 is configured to couple to a fluid supply (e.g., fluid source 120 in FIG. 1), the drip leg portion 250 is configured to trap sediment present in the fluid received from the fluid supply, and the outlet leg portion 230 is configured to deliver the sediment-free fluid to the appliance 102 (FIG. 1). Sediment may include, but is not limited to, for example, shavings, threading compound, debris, dirt, and/or moisture.

An issue with existing fluid sediment trap assemblies made from multiple components coupled together (e.g., threaded together) is that the components can be separated to gain access to the fluid circuit (for example, the drip leg or the cap of the drip leg can be removed and refit with a threaded pipe) for theft of service, namely, to connect another, non-authorized, appliance to the fluid line. This has the dual effect of potentially overloading the fluid circuit with more appliances than the size (e.g., diameter) of the fluid lines are capable of handling and eliminating the sediment trapping function present in the fluid circuit. Without a sediment trap installed in the fluid circuit, sediment from the supplied fluid can enter the appliance, causing damage to, or even complete failure of, the appliance. Even a sediment trap that is formed of a single piece is prone to the same issues as the existing fluid sediment trap assemblies formed from multiple components, as a single piece sediment trap can still be threaded or tapped at is drip leg for theft of service.

The disclosed tamper-proof sediment trap 200 overcomes these issues by being monolithic, e.g., made of one single piece, and having a drip leg portion 250 possessing an outer profile or surface structure, or otherwise defining a shape, that is incapable of being tapped. As used in this disclosure, the term "monolithic" includes being made of one piece and or being integrally formed. Thus, the central body portion 210, the outlet leg portion 230, and the drip leg portion 250 are monolithically formed and are described herein as portions or sections of the tamper-proof sediment trap 200 which are non-separable from each other. The tamper-proof sediment trap 200 may be made out of any material or combination of materials that are typically used with and/or certified for use with fluid piping. This includes, for example, brass, forged brass, iron, steel, and other suitable materials. All of the portions of the tamper-proof sediment trap 200 may be formed of the same material, or alternatively, some portions may be formed of a first material while other portions are formed of a second, different material.

The outlet leg portion 230 extends upward away from a side of the central body portion 210 parallel to the central longitudinal axis "L" of the central body portion 210 and defines an outlet 232 at its end. The outlet leg portion 230 is configured to be coupled to the appliance 102. In aspects, the outlet 232 may include a national pipe thread (NPT) female thread and/or an NPT male thread. The NPT thread may be of any suitable diameter, for example, anywhere in the range of about ½"-6". In an aspect, for example, the outlet leg portion 230 may include a FIP union for coupling to a pipe nipple. In another example, the outlet leg portion 230 may include a male flare union for coupling to a fluid hose with a flare connection.

The supply leg portion 220 extends radially outward from the central body portion 210, at a point along the central longitudinal axis "L" of the central body portion 210 between the outlet leg portion 230 and the drip leg portion 250, and has a central longitudinal axis "Lb" extending perpendicular to the central longitudinal axis "L" of the central body portion 210. The supply leg portion 220 is configured to enable the flow of fluid from a fluid source 120 (FIG. 1A) to the central body portion 210 for enabling sediment to drop to the drip leg portion 250 while sediment-free fluid flows up through the outlet leg portion 230 to the connected appliance 102. The supply leg portion 220 extends generally perpendicular to the length of the central body portion 210, but may extend therefrom at any angle. In aspects, a proximal end 210a of the supply leg portion 220 may include an NPT female thread and or an NPT male thread. The NPT thread may be of any suitable diameter, for example, anywhere in the range of about ½"-6". In an aspect, for example, the supply leg portion 220 may include a FIP union for coupling to a pipe nipple. In another example, the supply leg portion 220 may include a male flare union for coupling to a fluid hose with a flare connection.

Any of the central body portion 210, the supply leg portion 220, the outlet leg portion 230, and/or the drip leg portion 250 may include an access tap 204 configured for connecting a small non-appliance tool or gauge or for clean-out access to the lumen 202 of the tamper-proof sediment trap 200. The access tap 204 may define a raised flattened surface protruding from an outer surface of the central body portion 210, or any portion of the tamper-proof sediment trap 200, and may be centered at an intersection of the central longitudinal axis "Lb" of the supply leg portion 220 and the central longitudinal axis "L" of the central body portion 210, but any position is contemplated. Additionally, although a single access tap 204 is illustrated and described, it is appreciated that any number of access taps may be included on the tamper-proof sediment trap 200. The access tap 204 defines a threaded opening that may be dimensioned such that the size of the tap is limited to a size that can only be tapped, or otherwise accessed, by lines that are too small to fuel an appliance, but large enough to connect a small pressure gauge or blow-out line, for example, for purge and pressure-tap purposes. For example, the access tap 204 can be tapped to any suitably sized thread, for example, but not limited to ¼", ⅛", or ⅜", or any size suitable for accessing the inner lumen 202 while not being large enough to connect a line to another appliance therefrom. In one aspect the access tap may be utilized to access the inside of drip leg portion 250 to clean-out sediment or other debris accumulated therein. The opening defined by the access tap 204 may be plugged by any suitable removable plug and/or may utilize a Pete's Plug® access plug. The utilization of a plug to close the opening of the access tap 204, as opposed to a cap to close the opening of the access tap 204, enables the connection and disconnection of a line to the access tap 204 without the need to pressure-test the integrity of the fluid circuit after the disconnection.

Figure 5A:
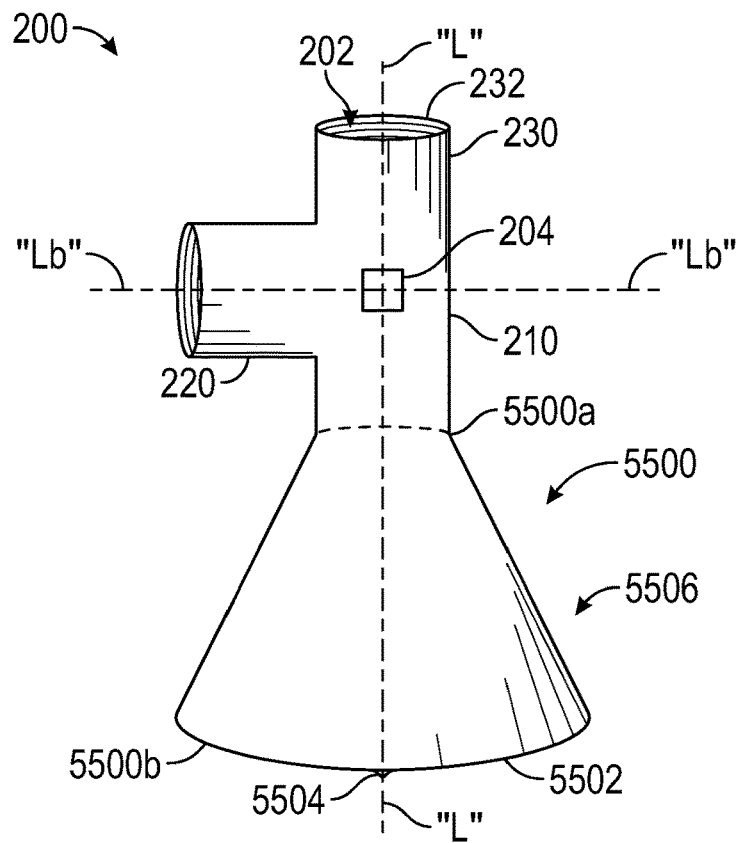
FIG. 5A is a side view of a tamper-proof sediment trap having a drip leg portion defining a reverse cone shape with an outward taper, in accordance with the disclosure.
Figure 5B:
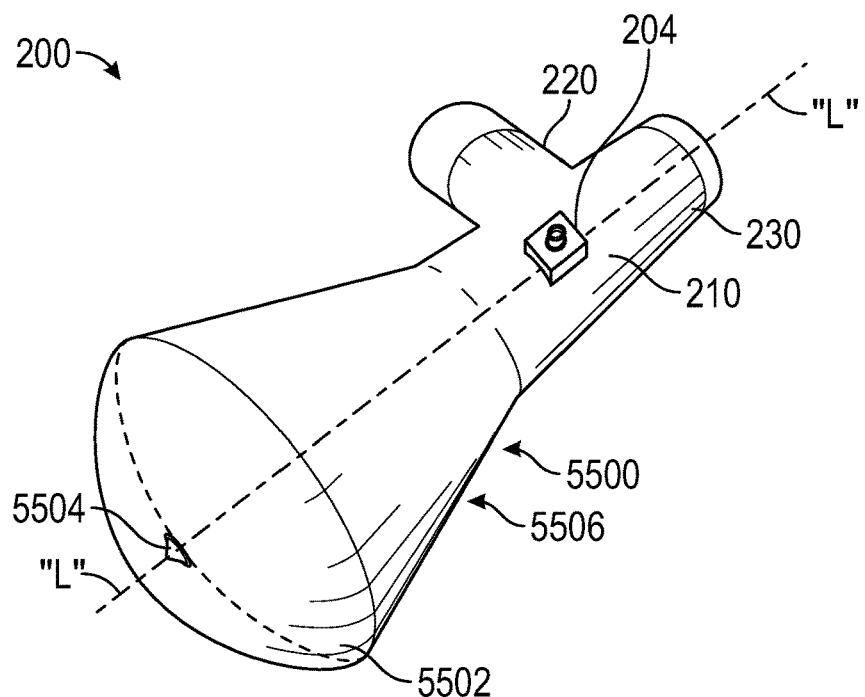
FIG. 5B is a side, perspective view of the tamper-proof sediment trap of FIG. 5A, in accordance with the disclosure.
Figure 5C:
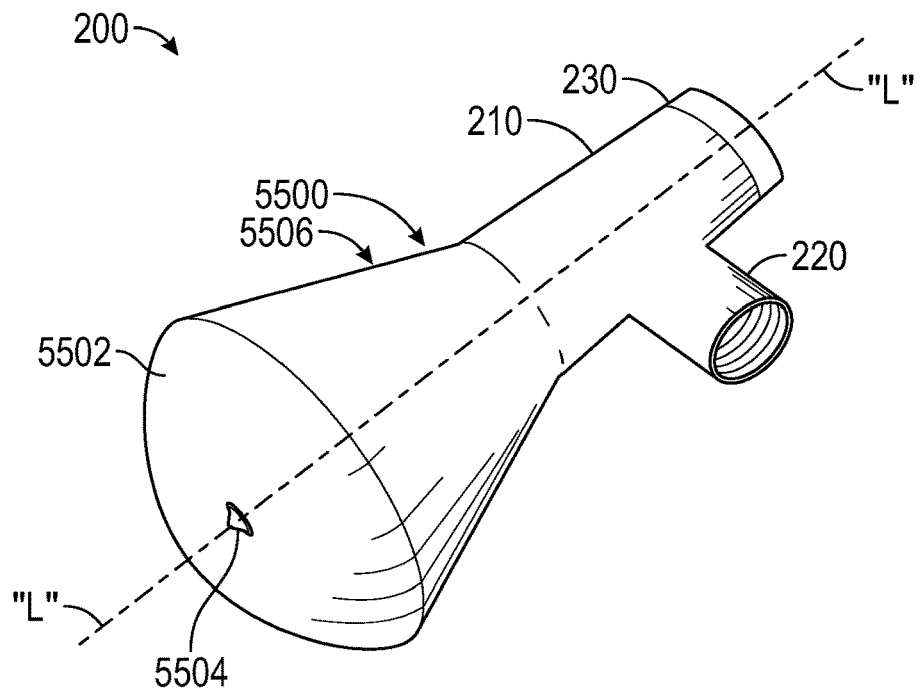
FIG. 5C is a bottom front perspective view of the tamper-proof sediment trap of FIG. 5A, in accordance with the disclosure.
Figure 5D:
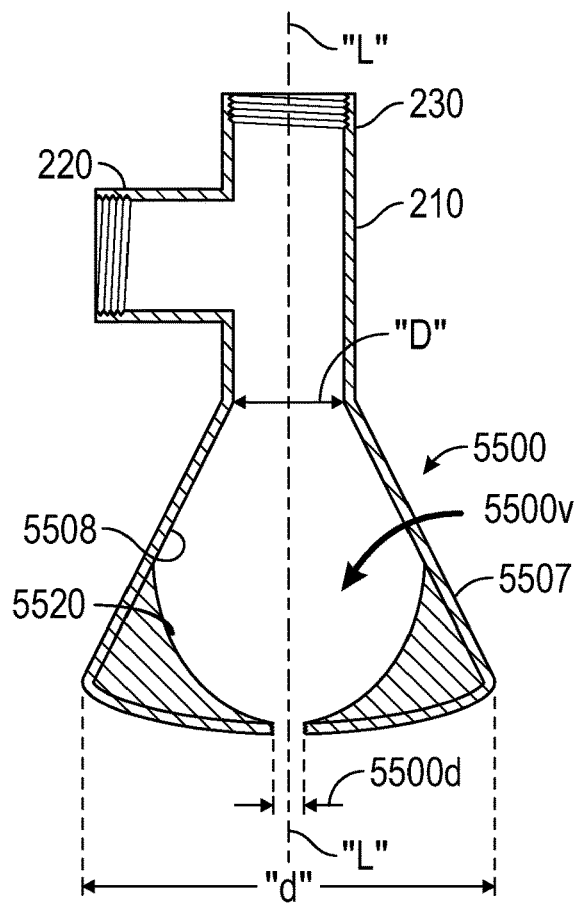
FIG. 5D is a side cross-sectional view of the tamper-proof sediment trap of FIG. 5A, in accordance with the disclosure.
Figure 6A:
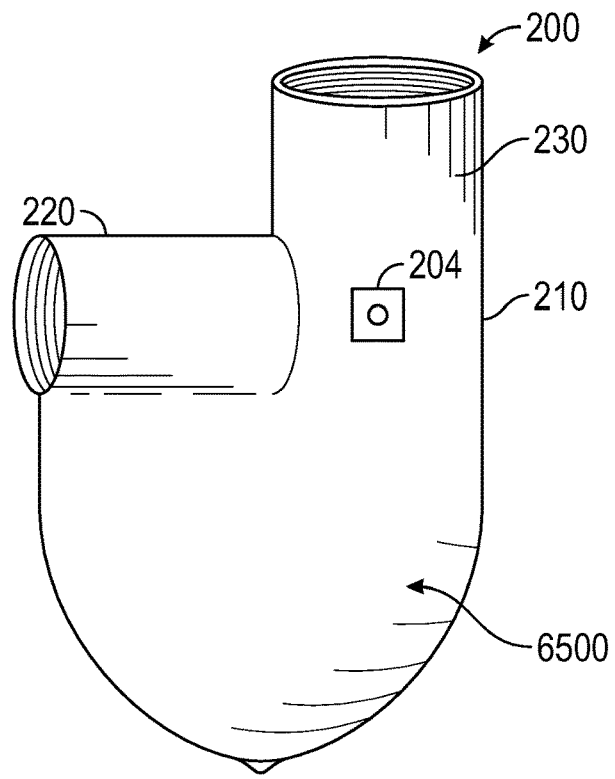
FIG. 6A is a side view of a tamper-proof sediment trap having a drip leg portion with a shortened length and widened width, in accordance with the disclosure.
Figure 6B:
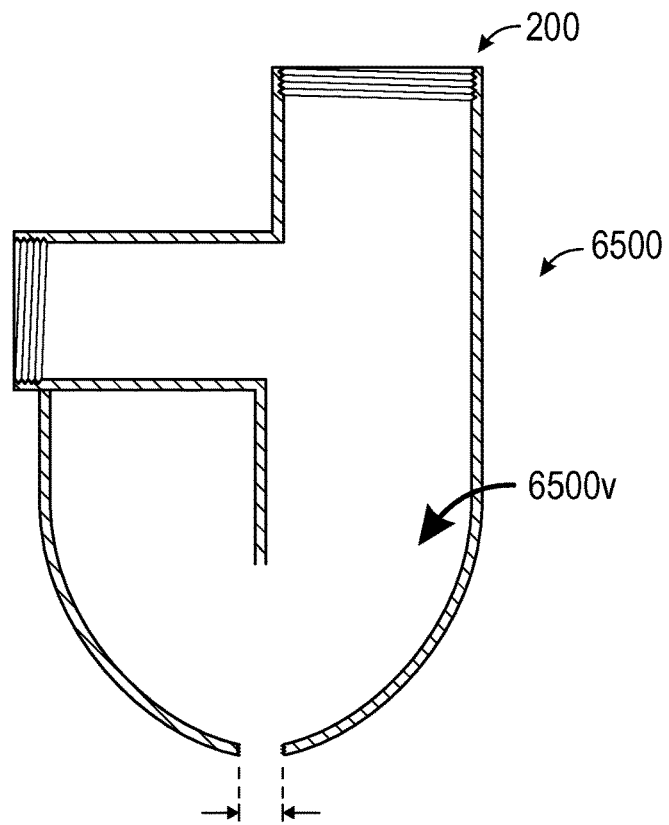
FIG. 6B is a side cross-sectional view of the tamper-proof sediment trap of FIG. 6A, in accordance with the disclosure.
Figure 6C:
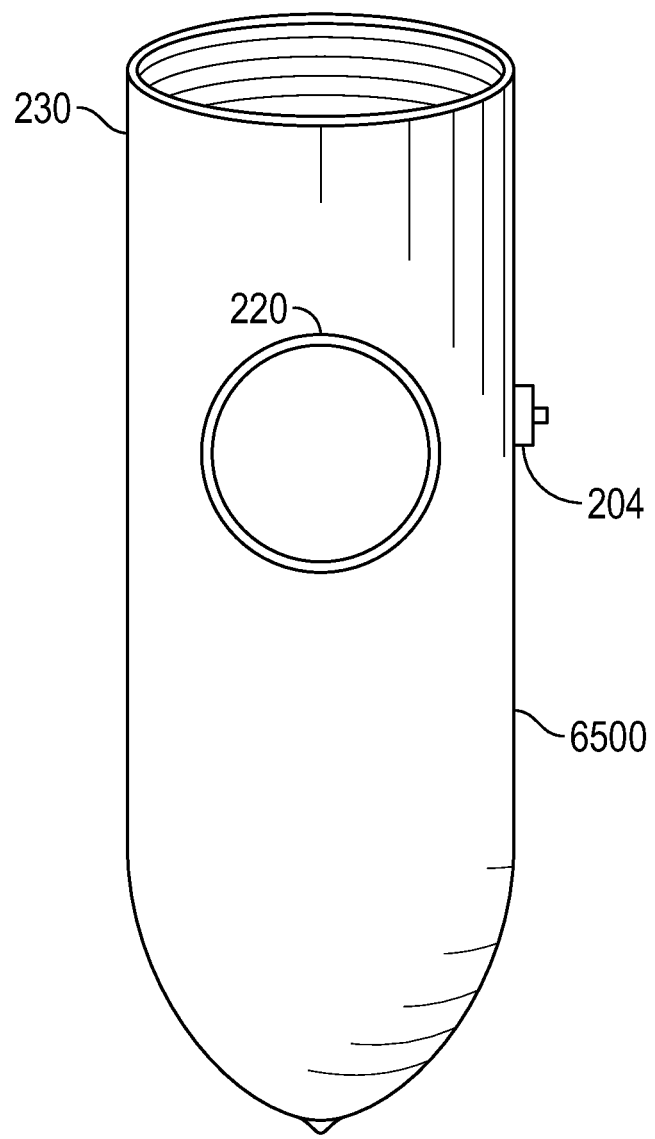
FIG. 6C is a side view of the tamper-proof sediment trap of FIG. 6A, in accordance with the disclosure.

The various disclosed aspects of drip leg portion 250 of the tamper-proof sediment trap 200 will now be described in detail, in turn, as drip leg portion 2500 (FIGS. 2A-2D), drip leg portion 3500 (FIGS. 3A-3D), drip leg portion 4500 (FIGS. 4A-4D), drip leg portion 5500 (FIGS. 5A-5D), and drip leg portion 6500 (FIGS. 6A-6C). Each of drip leg portion 2500 (FIGS. 2A-2D), drip leg portion 3500 (FIGS. 3A-3D), drip leg portion 4500 (FIGS. 4A-4D), drip leg portion 5500 (FIGS. 5A-5D), and drip leg portion 6500 (FIGS. 6A-6C) are similar in scope, and possess similar structure and features except for the specific differences described below with respect to each.

With reference to FIGS. 2A-2D, one aspect of the tamper-proof sediment trap 200 includes a drip leg portion 2500 defining an oblique conical frustum, having an offset inward taper. The drip leg portion 2500 extends downward from the central body portion 210, is configured to collect sediment therein, and includes a proximal portion 2500a and a distal portion 2500b. The proximal portion 2500a has a diameter "D" which is substantially equal to the diameter of the base from which it extends (e.g., from a distal portion of central body portion 210) and the distal portion 2500*b* has a diameter "d" being smaller than the diameter "D" of the proximal portion 2500*a*, thereby defining the inward taper along its length. Although the proximal portion 2500*a* is illustrated as a circular base of the oblique conical shape, and is described as having a diameter "D", it is contemplated that the base may be any shape, including a polygonal shape, forming one or more flat faces of the outer surface 2507 along the length of the drip leg portion 2500.

A drip outlet 2502 is located at the distal portion 2500*b* of the drip leg portion 2500 and defines an opening configured for drainage and/or cleaning of the tamper-proof sediment trap 200. The diameter "d" of the distal portion 2500*b* where the drip outlet 2502 is located, and thus, the size 2500*d* of the opening defined by the drip outlet 2502, is small enough that an appliance cannot be connected to the tamper-proof sediment trap 200 from the opening of the drip outlet 2502. A ratio may exist between the size 2500*d* of the opening and the size of the diameter of the supply leg portion 220 and/or the size of the diameter of the outlet leg portion 230. The size 2500*d* of the opening may be based on the diameter of the supply leg portion 220 and/or the outlet leg portion 230. In particular, the size 2500*d* of the opening may be larger (e.g., ⅜") for tamper-proof sediment traps having larger diameter supply leg portions 220 and/or outlet leg portions 230 (e.g., 2") and may be smaller (e.g., ⅛") for tamper-proof sediment traps having smaller diameter supply leg portions 220 and/or outlet leg portions 230 (e.g., ¾"). The drip outlet 2502 defines an opening which may have a smooth or threaded inner surface, and may additionally or alternatively be threaded on its outer surface. The drip outlet 2502 may be plugged with a removable plug 2504 screwed into a female thread formed on an inner surface of the drip outlet 2502 within the opening defined by the drip outlet 2502, or may be capped with a cap screwed onto a threaded outer surface of the drip outlet 2502. The drip outlet 2502, after removal of the removable plug 2504 or cap, is configured to enable access to an inside of the drip leg portion 2500 for removal of any sediment accumulated within the drip leg portion 2500. The removable plug 2504 may be a Pete's Plug® access plug. In aspects, the drip outlet 2502 may have a male thread, and the removable plug 2504 may have a female thread and be externally mounted (e.g., a cap). The threaded inner or outer surface of the drip outlet 2502 may have a standard-directional thread or a reverse-directional thread configuration. In an aspect, the opening defined by the drip outlet 2502 is non-circular in shape. Additionally, with reference to FIG. 2D, the inner surface of the distal portion 2500*b* of the drip leg portion 2500 may define an anti-stagnant feature 2520 which is bowl-shaped or otherwise tapers inwardly toward the drip outlet 2502 to direct all sediment toward the outlet thereby preventing the build-up of sediment which would be difficult to remove during clean-out of the interior of the drip leg portion 2500.

The drip leg portion 2500 may define a length being long enough to prevent a vortex from sucking sediment back up from the drip leg portion 2500 to other portions of the tamper-proof sediment trap 200 such as the central body portion 210 and the outlet leg portion 230 and eventually enter into to an appliance 102 (FIG. 1). In aspects, the drip leg portion 2500 is at least about 3 inches long. In aspects, the thickness of the walls of the drip leg portion 2500 is greater than the thickness of the walls of the other portions of the tamper-proof sediment trap 200 such as the central body portion 210, the supply leg portion 220, and/or the outlet leg portion 230 to further prevent the ability to tap, or otherwise couple to, the drip leg portion 2500. Additionally, or alternatively, the material forming the drip leg portion 2500 may possess a greater strength or hardness than that of the other portions of the tamper-proof sediment trap 200 such as the central body portion 210, the supply leg portion 220, and/or the outlet leg portion 230 to further prevent the ability to tap, thread, or otherwise couple to, the drip leg portion 2500.

The drip leg portion 2500 defines an oblique conical shape that makes it difficult, if not impossible, to tap. As shown in FIGS. 2A-2D, the drip leg portion 2500 has an offset taper. The taper of the drip leg portion 2500 begins close enough to the central body portion 210 such that the drip leg portion 2500 cannot be cut off or otherwise removed to thread or tap the remaining portions of the drip leg portion 2500 or portions of the central body portion 210. In other words, the proximal-most end of the proximal portion 2500*a* of the drip leg portion 2500 begins proximate the point along the central longitudinal axis "L" where the supply leg portion 220 extends radially outward and may be spaced therefrom a maximum distance "H" (FIG. 2B) to prevent the possibility of the formation of a vortex or siphon upward towards the outlet leg portion 230, thereby ensuring that all sediment drops into the drip leg portion 2500.

With continued reference to FIGS. 2A-2D, the oblique conical shape defined by the drip leg portion 2500 forms an outer profile 2506 which thwarts the ability to tap or thread the outer surface 2507 of the drip leg portion 2500. As described above, drip leg portion 2500 is generally shaped as an oblique circular cone or frustum, where its axis passes through the base non-perpendicularly, with at least one side tapering smoothly inward towards the drip outlet 2502 (when viewed from a side perspective). In particular, the apex 2510 of the cone or frustum of the drip leg portion 2500 is not centered over the base of the drip leg portion 2500. With such a configuration, the position of the drip outlet 2502 is offset from the central longitudinal axis "L" of the central body portion 210.

Figure 2A:
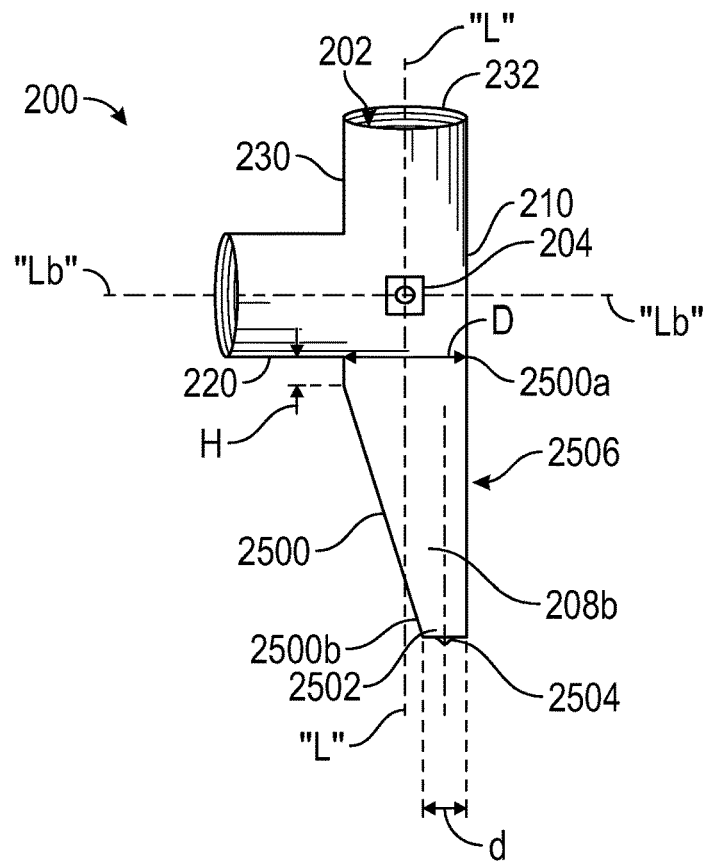
FIG. 2A is a side view of the tamper-proof sediment trap of FIG. 1 having a drip leg portion defining an oblique cone shape having an offset taper, in accordance with the disclosure.
Figure 2B:
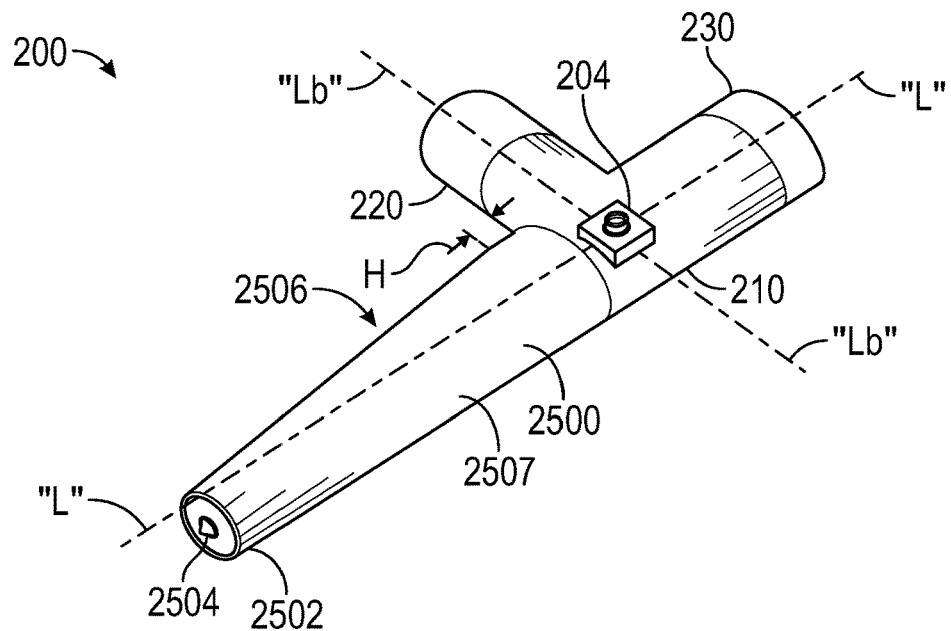
FIG. 2B is a side, perspective view of the tamper-proof sediment trap of FIG. 2A, in accordance with the disclosure.
Figure 2C:
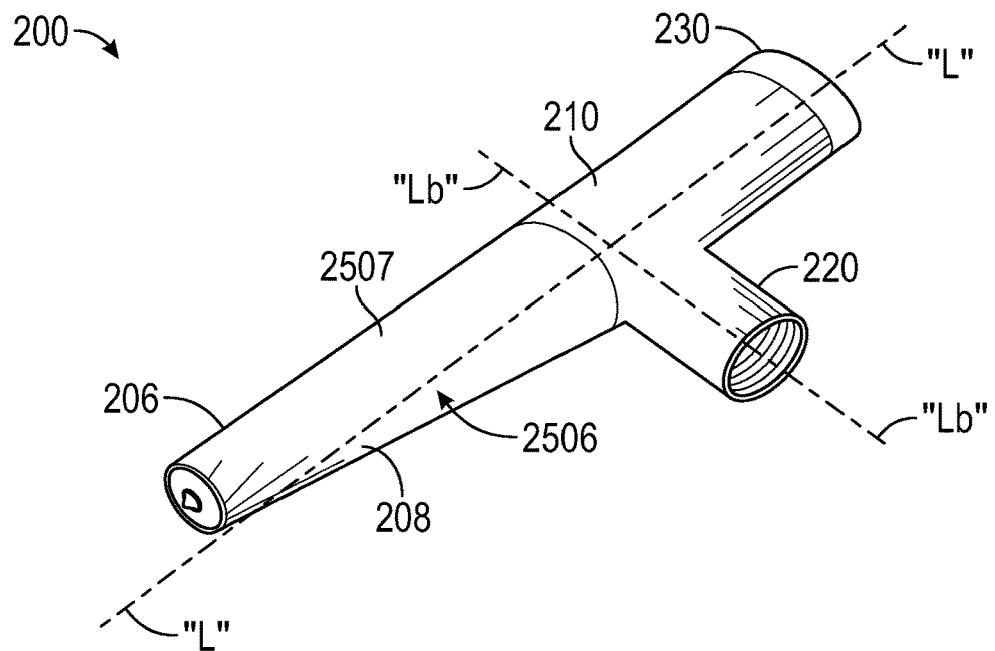
FIG. 2C is a side, perspective view of the tamper-proof sediment trap of FIG. 2A, in accordance with the disclosure.
Figure 2D:
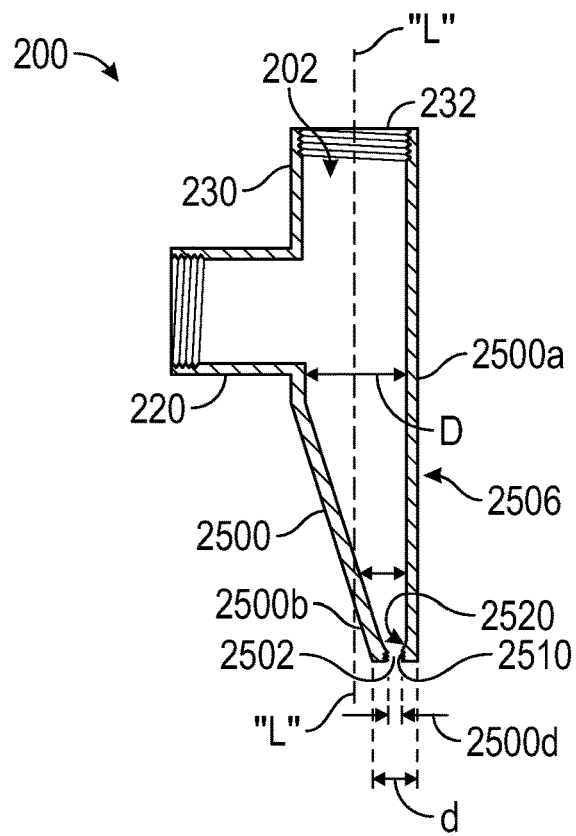
FIG. 2D is a side cross-sectional view of the tamper-proof sediment trap of FIG. 2A, in accordance with the disclosure.

With particular reference to FIG. 2D, portions of the inner surface 2508 of the drip leg portion 2500 may be smooth or textured to modify the flow properties of fluid within the drip leg portion 2500 and to further inhibit the ability to tap the inner surface 2508 of drip leg portion 2500. Additionally or alternatively, with continued reference to FIG. 2D, when viewed from a side perspective, at least one side of the drip leg portion 2500 may be straight, that is, at least one side may extend linearly downward with no taper toward the drip outlet 2502. In one embodiment, the straight side of the drip leg portion 2500 extends downward from a side of the central body portion 210 that is opposite the side of the central body portion from which the supply leg portion 220 extends such that as fluid enters the tamper-proof sediment trap 200 from the supply leg portion 220, the fluid and sediment therein hits the straight wall of the interior of the central body portion 210 which continuous to the straight wall of the drip leg portion 2500.

With reference to FIGS. 3A-3D, another aspect of the tamper-proof sediment trap 200 includes a drip leg portion 3500 defining a generally conical shape, that is, of a right circular cone or frustum. The drip leg portion 3500 is similar to the drip leg portion 2500, and the other drip leg portions described herein, and therefore only the differences therebetween will be described in detail. The drip leg portion 3500 extends downward from the central body portion 210 tapering inward, is configured to collect sediment therein, and includes a proximal portion 3500*a* and a distal portion 3500*b*. The proximal portion 3500*a* has a diameter "D" which is substantially equal to the diameter of the base from which it extends (e.g., from a distal portion of central body portion 210) and the distal portion 3500b has a diameter "d" being smaller than the diameter "D" of the proximal portion 3500a, thereby defining the inward taper along its length. Although the proximal portion 3500a is illustrated as a circular base of the conical shape, and is described as having a diameter "D", it is contemplated that the base may be any shape, including a polygonal shape, forming one or more flat faces of the outer surface 3507 along the length of the drip leg portion 3500.

A drip outlet 3502 is located at the distal portion 3500b of the drip leg portion 3500 and defines an opening configured for drainage and/or cleaning of the tamper-proof sediment trap 200. The diameter "d" of the distal portion 3500b where the drip outlet 3502 is located, and thus, the size 3500d of the opening defined by the drip outlet 3502, is small enough that an appliance cannot be connected to the tamper-proof sediment trap 200 from the opening of the drip outlet 3502. A ratio may exist between the size 3500d of the opening and the size of the diameter of the supply leg portion 220 and/or the size of the diameter of the outlet leg portion 230. The size 3500d of the opening may be based on the diameter of the supply leg portion 220 and/or the outlet leg portion 230. In particular, the size 3500d of the opening may be larger (e.g., ⅜") for tamper-proof sediment traps having larger diameter supply leg portions 220 and/or outlet leg portions 230 (e.g., 2") and may be smaller (e.g., ⅛") for tamper-proof sediment traps having smaller diameter supply leg portions 220 and/or outlet leg portions 230 (e.g., ¾"). The drip outlet 3502 defines an opening which may have a smooth or threaded inner surface, and may additionally or alternatively be threated on its outer surface. The drip outlet 3502 may be plugged with a removable plug 3504 screwed into a female thread formed on an inner surface of the drip outlet 3502 within the opening defined by the drip outlet 3502, or screwed onto a threaded outer surface of the drip outlet 3502. The drip outlet 3502, after removal of the removable plug 3504, is configured to enable access to an inside of the drip leg portion 3500 for removal of any sediment accumulated within the drip leg portion 3500. In aspects, the drip outlet 3502 may have a male thread, and the removable plug 3504 may have a female thread and be externally mounted (e.g., a cap). The threaded inner or outer surface of the drip outlet 3502 may have a standard-directional thread or a reverse-directional thread configuration. In an aspect, the opening defined by the drip outlet 3502 is non-circular in shape. Additionally, with reference to FIG. 3D, the inner surface of the distal portion 3500b of the drip leg portion 3500 may define an anti-stagnant feature 3520 which is bowl-shaped or otherwise tapers inwardly toward the drip outlet 3502 to direct all sediment toward the outlet thereby preventing the build-up of sediment which would be difficult to remove during clean-out of the interior of the drip leg portion 3500.

The drip leg portion 3500 may define a length being long enough to prevent a vortex from sucking sediment back up from the drip leg portion 3500 to other portions of the tamper-proof sediment trap 200 such as the central body portion 210 and the outlet leg portion 230 and eventually enter into to an appliance 102 (FIG. 1). In aspects, the drip leg portion 3500 is at least about 3 inches long. In aspects, the thickness of the walls of the drip leg portion 3500 is greater than the thickness of the walls of the other portions of the tamper-proof sediment trap 200 such as the central body portion 210, the supply leg portion 220, and/or the outlet leg portion 230 to further prevent the ability to tap, or otherwise couple to, the drip leg portion 3500. Additionally, or alternatively, the material forming the drip leg portion 3500 may possess a greater strength or hardness than that of the other portions of the tamper-proof sediment trap 200 such as the central body portion 210, the supply leg portion 220, and/or the outlet leg portion 230 to further prevent the ability to tap, thread, or otherwise couple to, the drip leg portion 3500.

The drip leg portion 3500 defines a conical shape that makes it difficult, if not impossible, to tap. As shown in FIGS. 3A-3D, the drip leg portion 3500 has a consistent taper where the drip outlet 3502 is centrally aligned with the central longitudinal axis "L" of the central body portion 210, but a non-consistent taper is also contemplated. The taper of the drip leg portion 3500 begins close enough to the central body portion 210 such that the drip leg portion 3500 cannot be cut off or otherwise removed to thread or tap the remaining portions of the drip leg portion 3500 or portions of the central body portion 210. In other words, the proximal-most end of the proximal portion 3500a of the drip leg portion 3500 begins proximate the point along the central longitudinal axis "L" where the supply leg portion 220 extends radially outward and may be spaced therefrom a maximum distance to prevent the possibility of the formation of a vortex or siphon upward towards the outlet leg portion 230, thereby ensuring that all sediment drops into the drip leg portion 3500.

Figure 3A:
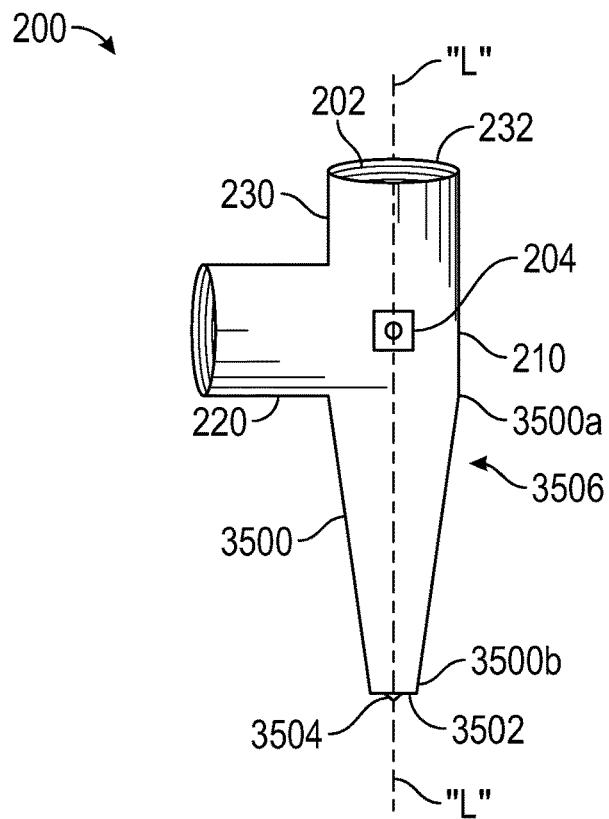
FIG. 3A is a side view of a tamper-proof sediment trap having a drip leg portion defining a frustoconical shape being centrally tapered, in accordance with the disclosure.
Figure 3B:
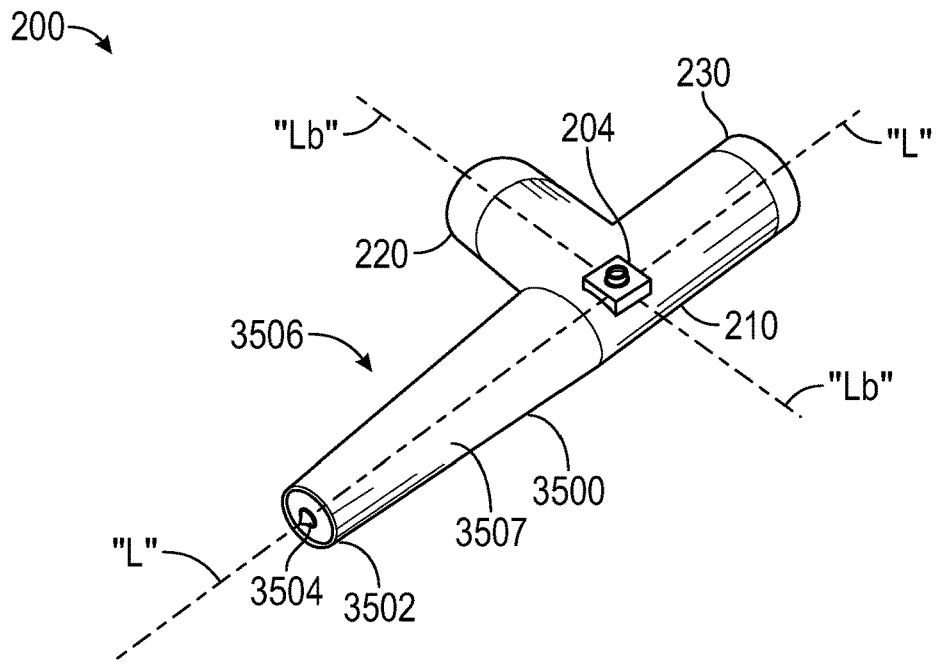
FIG. 3B is a side, perspective view of the tamper-proof sediment trap of FIG. 3A, in accordance with the disclosure.
Figure 3C:
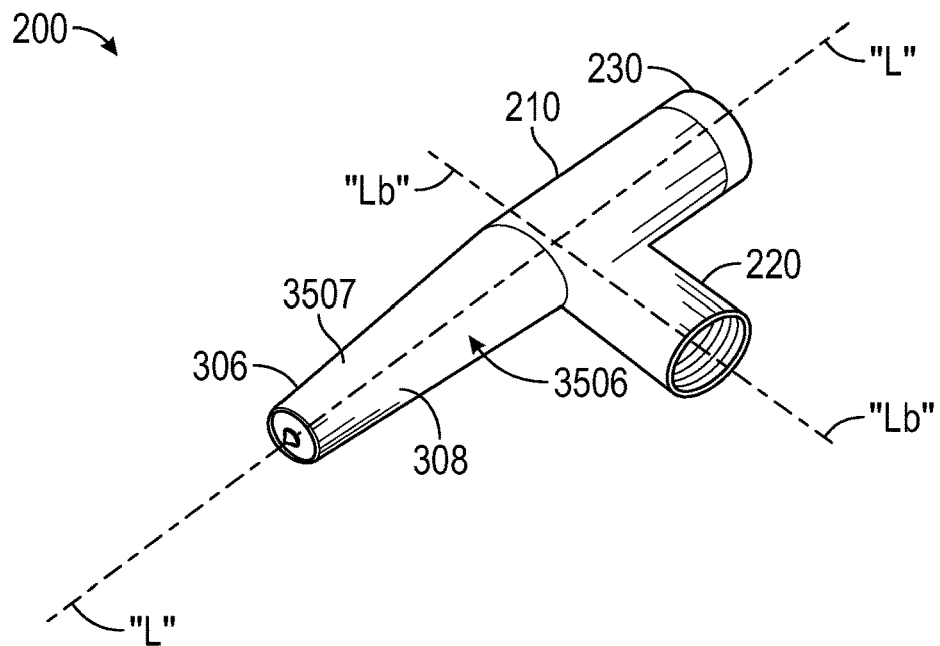
FIG. 3C is a side, perspective view of the tamper-proof sediment trap of FIG. 3A, in accordance with the disclosure.
Figure 3D:
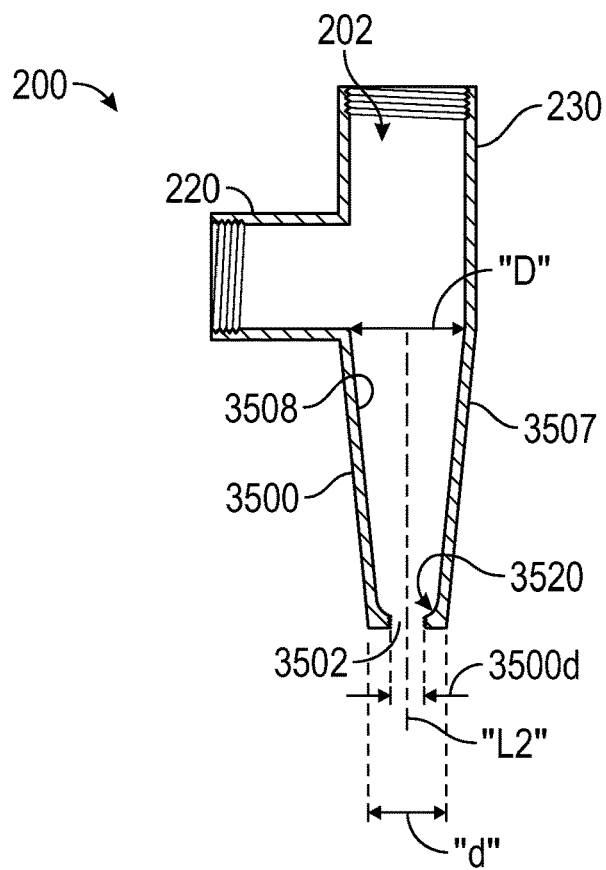
FIG. 3D is a side cross-sectional view of the tamper-proof sediment trap of FIG. 3A, in accordance with the disclosure.

With continued reference to FIGS. 3A-3D, the conical shape defined by the drip leg portion 3500 forms an outer profile 3506 which thwarts the ability to tap or thread the outer surface 3507 of the drip leg portion 3500. As described above, drip leg portion 3500 is generally shaped as a cone, where its axis passes through the base perpendicularly, with sides tapering smoothly towards the drip outlet 3502. With such a configuration, the position of the drip outlet 3502 is aligned with the central longitudinal axis "L" of the central body portion 210. With particular reference to FIG. 3D, portions of the inner surface 3508 of the drip leg portion 3500 may be smooth or textured to modify the flow properties of fluid within the drip leg portion 3500 and to further inhibit the ability to tap the inner surface 3508 of drip leg portion 3500.

With reference to FIGS. 4A-4D, another aspect of the tamper-proof sediment trap 200 includes a drip leg portion 4500 defining a generally conical shape with an inward taper, that is, of a right circular cone while having a spiral outer surface texture. The drip leg portion 4500 extends downward from the central body portion 210, is configured to collect sediment therein, and includes a proximal portion 4500a and a distal portion 4500b. The proximal portion 4500a has a diameter "D" which is substantially equal to the diameter of the base from which it extends (e.g., from a distal portion of central body portion 210) and the distal portion 4500b has a diameter "d" being smaller than the diameter "D" of the proximal portion 3500a, thereby defining the inward taper. Although the proximal portion 4500a is illustrated as a circular base of the conical shape, and is described as having a diameter "D", it is contemplated that the base may be any shape, including a polygonal shape, forming one or more flat faces of the outer surface 4507 along the length of the drip leg portion 4500.

A drip outlet 4502 is located at the distal portion 4500b of the drip leg portion 4500 and defines an opening configured for drainage and/or cleaning of the tamper-proof sediment trap 200. The diameter "d" of the distal portion 4500b where the drip outlet 4502 is located, and thus, the size 4500d of the opening defined by the drip outlet 4502, is small enough that an appliance cannot be connected to the tamper-proof sediment trap 200 from the opening of the drip outlet 4502. A ratio may exist between the size 4500d of the opening and the size of the diameter of the supply leg portion 220 and/or the size of the diameter of the outlet leg portion 230. The size 4500d of the opening may be based on the diameter of the supply leg portion 220 and/or the outlet leg portion 230. In particular, the size 4500d of the opening may be larger (e.g., ⅜") for tamper-proof sediment traps having larger diameter supply leg portions 220 and/or outlet leg portions 230 (e.g., 2") and may be smaller (e.g., ⅛") for tamper-proof sediment traps having smaller diameter supply leg portions 220 and/or outlet leg portions 230 (e.g., ¾"). The drip outlet 4502 defines an opening which may have a smooth or threaded inner surface, and may additionally or alternatively be threated on its outer surface. The drip outlet 4502 may be plugged with a removable plug 4504 screwed into a female thread formed on an inner surface of the drip outlet 4502 within the opening defined by the drip outlet 4502, or screwed onto a threaded outer surface of the drip outlet 4502. The drip outlet 4502, after removal of the removable plug 4504, is configured to enable access to an inside of the drip leg portion 4500 for removal of any sediment accumulated within the drip leg portion 4500. In aspects, the drip outlet 4502 may have a male thread, and the removable plug 4504 may have a female thread and be externally mounted (e.g., a cap). The threaded inner or outer surface of the drip outlet 4502 may have a standard-directional thread or a reverse-directional thread configuration. In an aspect, the opening defined by the drip outlet 4502 is non-circular in shape. Additionally, with reference to FIG. 4D, the inner surface of the distal portion 4500b of the drip leg portion 4500 may define an anti-stagnant feature 4520 which is bowl-shaped or otherwise tapers inwardly toward the drip outlet 4502 to direct all sediment toward the outlet thereby preventing the build-up of sediment which would be difficult to remove during clean-out of the interior of the drip leg portion 4500.

The drip leg portion 4500 may define a length being long enough to prevent a vortex from sucking sediment back up from the drip leg portion 4500 to other portions of the tamper-proof sediment trap 200 such as the central body portion 210 and the outlet leg portion 230 and eventually enter into to an appliance 102 (FIG. 1). In aspects, the drip leg portion 4500 is at least about 3 inches long. In aspects, the thickness of the walls of the drip leg portion 4500 is greater than the thickness of the walls of the other portions of the tamper-proof sediment trap 200 such as the central body portion 210, the supply leg portion 220, and/or the outlet leg portion 230 to further prevent the ability to tap, or otherwise couple to, the drip leg portion 4500. Additionally, or alternatively, the material forming the drip leg portion 4500 may possess a greater strength or hardness than that of the other portions of the tamper-proof sediment trap 200 such as the central body portion 210, the supply leg portion 220, and/or the outlet leg portion 230 to further prevent the ability to tap, thread, or otherwise couple to, the drip leg portion 4500.

The drip leg portion 4500 defines a conical shape that makes it difficult, if not impossible, to tap. As shown in FIGS. 4A-4D, the drip leg portion 4500 has a consistent taper where the drip outlet 4502 is centrally aligned with the central longitudinal axis "L" of the central body portion 210, but a non-consistent taper is also contemplated. The taper of the drip leg portion 4500 begins close enough to the central body portion 210 such that the drip leg portion 4500 cannot be cut off or otherwise removed to thread or tap the remaining portions of the drip leg portion 4500 or portions of the central body portion 210. In other words, the proximal-most end of the proximal portion 4500a of the drip leg portion 4500 begins proximate the point along the central longitudinal axis "L" where the supply leg portion 220 extends radially outward.

Figure 4A:
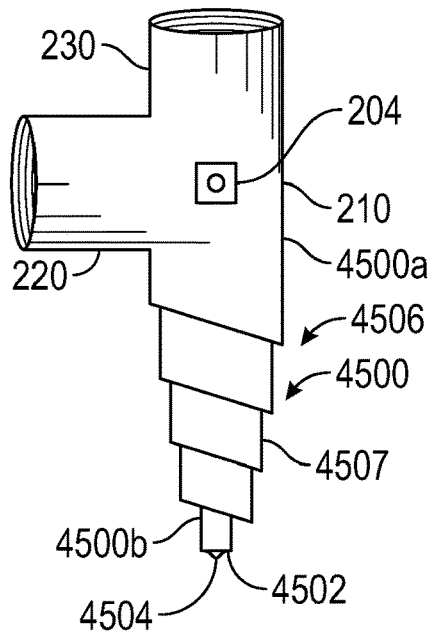
FIG. 4A is a side view of a tamper-proof sediment trap having a drip leg portion defining a conical shape with a spiral outer surface, in accordance with the disclosure.
Figure 4B:
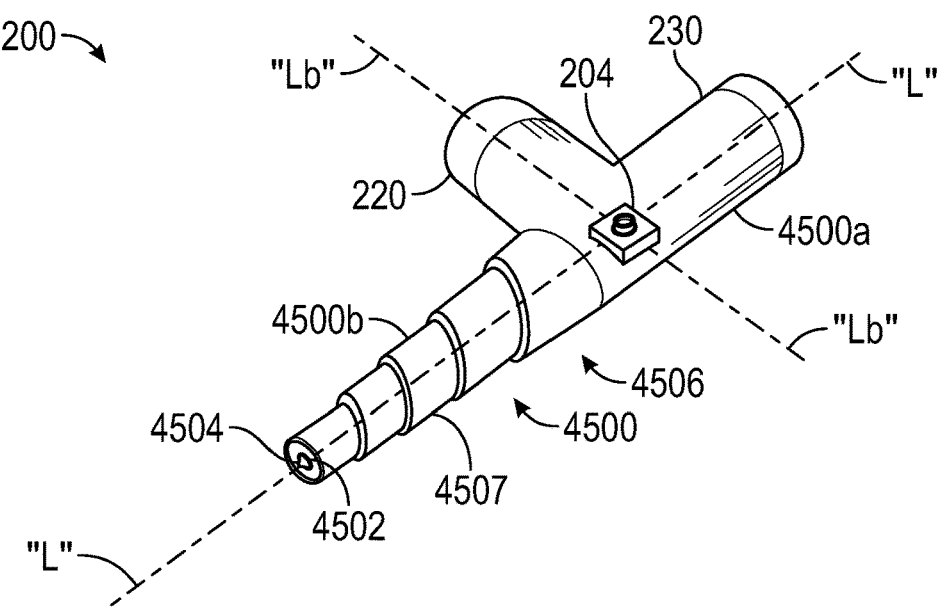
FIG. 4B is a side, perspective view of the tamper-proof sediment trap of FIG. 4A, in accordance with the disclosure
Figure 4C:
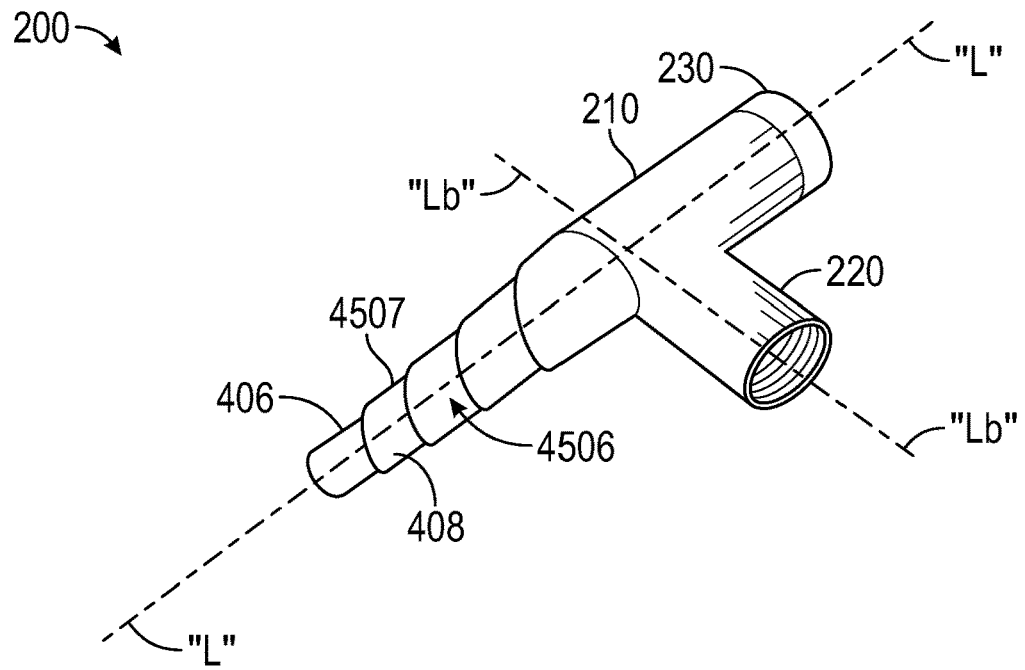
FIG. 4C is a side, perspective view of the tamper-proof sediment trap of FIG. 4A, in accordance with the disclosure.
Figure 4D:
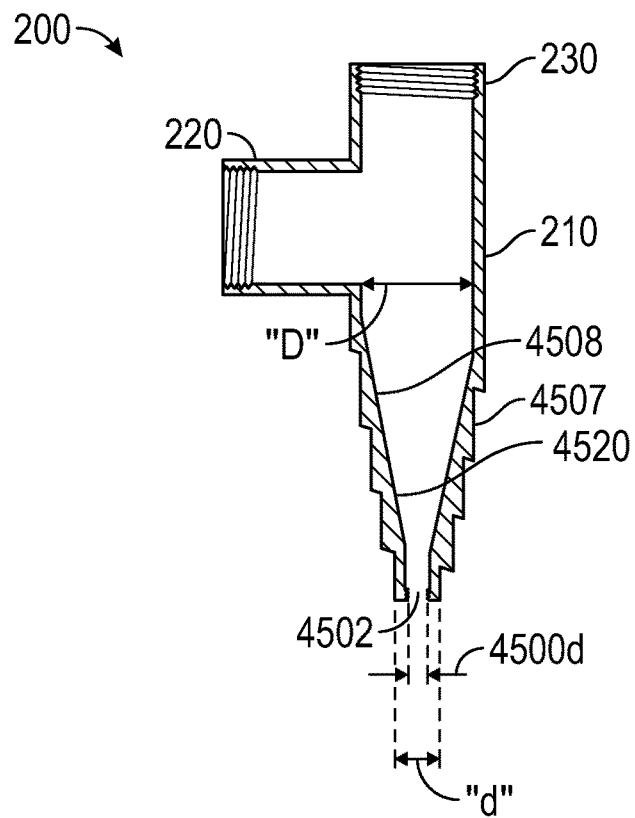
FIG. 4D is a side cross-sectional view of the tamper-proof sediment trap of FIG. 4A, in accordance with the disclosure.

With continued reference to FIGS. 4A-4D, the conical shape and spiraled outer surface 4507 defined by the drip leg portion 4500 forms an outer profile 4506 which thwarts the ability to tap or thread the outer surface 4507 of the drip leg portion 4500. As described above, drip leg portion 4500 is generally shaped as a cone, where its axis passes through the base perpendicularly, with sides tapering towards the drip outlet 4502. The drip leg portion 4500 is generally shaped as a spiral of increasingly smaller discrete diameters tapering towards the drip outlet 4502. Although described as a consistent spiral, a step-down configuration is also contemplated. In aspects, the inner surface 4508 of the drip leg portion 4500 may have a smooth taper towards the drip outlet 4502 or a stepped (e.g., spiral) surface to match the outer surface 4507 profile. With such a configuration, the position of the drip outlet 4502 is aligned with the central longitudinal axis "L" of the central body portion 210. With particular reference to FIG. 4D, portions of the inner surface 4508 of the drip leg portion 4500 may be smooth or textured to modify the flow properties of fluid within the drip leg portion 4500 and to further inhibit the ability to tap the inner surface 4508 of drip leg portion 4500.

With reference to FIGS. 5A-5D, another aspect of the tamper-proof sediment trap 200 includes a drip leg portion 5500 defining a reverse conical shape, that is, of a right circular cone tapering outwardly forming a tamper-proof sediment trap 200 with an increased interior volume 5500v, which may be beneficial for larger applications, and optional reduced overall length enabled by the increased interior volume 5500v which may be useful for tightly-spaced applications. The drip leg portion 5500 extends downward from the central body portion 210, is configured to collect sediment therein, and includes a proximal portion 5500a and a distal portion 5500b. The proximal portion 5500a has a diameter "D" which is substantially equal to the diameter of the base from which it extends and the distal portion 5500b has a diameter "d" being larger than the diameter "D" of the proximal portion 5500a, thereby defining the outward taper. In an aspect, the diameter "d" is dimensioned such that it does not exceed the distance from which the supply leg portion 220 extends from the central body portion 210. Although the proximal portion 5500a is illustrated as circular, and is described as having a diameter "D", it is contemplated that the proximal portion 5500a may be any shape, including a polygonal shape, forming one or more flat faces of the outer surface 5507 along the length of the drip leg portion 5500.

A drip outlet 5502 is located at the distal portion 5500b of the drip leg portion 5500 and defines an opening configured for drainage and/or cleaning of the tamper-proof sediment trap 200. The drip outlet 5502 defines an opening which may have a smooth or threaded inner surface, and may additionally or alternatively be threated on its outer surface. The drip outlet 5502 may be plugged with a removable plug 5504 screwed into a female thread formed on an inner surface of the drip outlet 5502 within the opening defined by the drip outlet 5502, or screwed onto a threaded outer surface of the drip outlet 5502. The drip outlet 5502, after removal of the removable plug 5504, is configured to enable access to an inside of the drip leg portion 5500 for removal of any sediment accumulated within the drip leg portion 5500. In aspects, the drip outlet 5502 may have a male thread, and the removable plug 5504 may have a female thread and be externally mounted (e.g., a cap). In an aspect, the opening defined by the drip outlet 5502 is non-circular in shape. Additionally, with reference to FIG. 5D, the inner surface of the distal portion 5500b of the drip leg portion 5500 may define an anti-stagnant feature 5520 which is bowl-shaped or otherwise tapers inwardly toward the drip outlet 5502 to direct all sediment toward the outlet thereby preventing the build-up of sediment which would be difficult to remove during clean-out of the interior of the drip leg portion 5000.

The drip leg portion 5500 may define a length being long enough to prevent a vortex from sucking sediment back up from the drip leg portion 5500 to other portions of the tamper-proof sediment trap 200 such as the central body portion 210 and the outlet leg portion 230 and eventually enter into to an appliance 102 (FIG. 1). In aspects, the drip leg portion 5500 is at least about 3 inches long, but a reduced length is contemplated given the increased interior volume 5500v formed by the outward flare of the sides. In aspects, the thickness of the walls of the drip leg portion 5500 is greater than the thickness of the walls of the other portions of the tamper-proof sediment trap 200 such as the central body portion 210, the supply leg portion 220, and/or the outlet leg portion 230 to further prevent the ability to tap, or otherwise couple to, the drip leg portion 5500. Additionally, or alternatively, the material forming the drip leg portion 5500 may possess a greater strength or hardness than that of the other portions of the tamper-proof sediment trap 200 such as the central body portion 210, the supply leg portion 220, and/or the outlet leg portion 230 to further prevent the ability to tap, thread, or otherwise couple to, the drip leg portion 5500.

The drip leg portion 5500 defines an outwardly tapering conical shape that makes it difficult, if not impossible, to tap, reduces the length of the drip leg portion 5500 and the tamper-proof sediment trap 200 as a whole, and increased the interior volume 5500v of the drip leg portion 5500. As shown in FIGS. 5A-5D, the drip leg portion 5500 has a consistent taper where the drip outlet 5502 is centrally aligned with the central longitudinal axis "L" of the central body portion 210, but a non-consistent taper is also contemplated. The outward taper of the drip leg portion 5500 begins close enough to the central body portion 210 such that the drip leg portion 5500 cannot be cut off or otherwise removed to thread or tap the remaining portions of the drip leg portion 5500 or portions of the central body portion 210. In other words, the proximal-most end of the proximal portion 5500a of the drip leg portion 5500 begins proximate the point along the central longitudinal axis "L" where the supply leg portion 220 extends radially outward.

With continued reference to FIGS. 5A-5D, the reverse conical shape defined by the drip leg portion 5500 forms an outer profile 5506 which thwarts the ability to tap or thread the outer surface 5507 of the drip leg portion 5500 and enables a shortened length of the tamper-proof sediment trap 200 useful for tightly-spaced applications. As described above, drip leg portion 5500 is generally shaped as a reverse cone, where its axis passes through the base perpendicularly, with sides tapering outward smoothly away from the drip outlet 5502. With such a configuration, the position of the drip outlet 5502 is aligned with the central longitudinal axis "L" of the central body portion 210. With particular reference to FIG. 5D, portions of the inner surface 5508 of the drip leg portion 5500 may be smooth or textured to modify the flow properties of fluid within the drip leg portion 5500 and to further inhibit the ability to tap the inner surface 5508 of drip leg portion 5500.

With reference to FIGS. 6A-6C, another aspect of the tamper-proof sediment trap 200 includes a drip leg portion 6500 defining a generally bowled lower portion forming an even further reduced-length tamper-proof sediment trap 200 useful for tightly-spaced applications, while forming an increased interior volume 6500v. The drip leg portion 6500 extends downward from the central body portion 210 and is wide enough that it also extends downward from the supply leg portion 220. Thus, the width of the drip leg portion 6500 is substantially equal to the distance between one edge of the central body portion and a point along the length of the supply leg portion 220. Although defining a reduced length, the interior volume of the drip leg portion 6500 is substantially equal to the interior volume of a 3" diameter pipe having a length greater than the length of the drip leg portion 6500.

Any of the above-described tamper-proof sediment traps 200 may include a floating/sliding plug configured to unplug the opening when the level of fluid within the drip leg portion exceeds a predetermined level. Additionally, or alternatively, any of the above-described tamper-proof sediment traps 200 may include a sensor (e.g., a fluid sensor) positioned such that an alarm is triggered when the level of fluid within the drip leg portion exceeds a predetermined level.

Certain embodiments of the present disclosure may include some, all, or none of the above advantages and/or one or more other advantages readily apparent to those skilled in the art from the drawings, descriptions, and claims included herein. Moreover, while specific advantages have been enumerated above, the various embodiments of the present disclosure may include all, some, or none of the enumerated advantages and/or other advantages not specifically enumerated above.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood that the foregoing description is only illustrative of the present disclosure. Various alternatives and modifications can be devised by those skilled in the art without departing from the disclosure. Accordingly, the present disclosure is intended to embrace all such alternatives, modifications, and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A tamper-proof fluid sediment trap, comprising:
a central body portion having a central longitudinal axis;
an outlet leg portion extending upward from the central body portion parallel to the central longitudinal axis of the central body portion, the outlet leg portion configured to be operably coupled to a gas appliance;
a drip leg portion extending downward from the central body portion and defining a shape being resistant to threading or tapping of an outer surface or an inner surface of the drip leg portion, wherein the outer surface of the drip leg portion is spiraled forming a spiraled inwardly tapered profile; and
a supply leg portion extending radially outward from the central body portion, between the outlet leg portion and the drip leg portion, and having a central longitudinal axis extending perpendicular to the central longitudinal axis of the central body portion, the supply leg portion configured to be operably coupled to a gaseous fluid supply line,
wherein the central body portion, the outlet leg portion, the supply leg portion, and the drip leg portion are monolithically formed and define a flow path for gaseous fluid to flow from the supply leg portion into the central body portion and upward from the central body portion to the outlet leg portion without passing through the drip leg portion.

2. The tamper-proof fluid sediment trap of claim 1, wherein the drip leg portion includes a drip outlet for removal of sediment trapped in the drip leg portion.

3. The tamper-proof fluid sediment trap of claim 2, further comprising at least one of a plug or a cap removably coupled to the drip outlet of the drip leg portion.

4. The tamper-proof fluid sediment trap of claim 1, wherein the drip leg portion defines an oblique conical shape having an apex being laterally offset from the central longitudinal axis of the central body portion.

5. The tamper-proof fluid sediment trap of claim 1, wherein a base of the drip leg portion is circular.

6. The tamper-proof fluid sediment trap of claim 1, wherein the inner surface of the drip leg portion is smooth.

7. The tamper-proof fluid sediment trap of claim 1, wherein the inner surface of the drip leg portion is textured.

8. The tamper-proof fluid sediment trap of claim 1, wherein the drip leg portion defines an inwardly tapered conical shape.

9. The tamper-proof fluid sediment trap of claim 1, wherein at least one of the outlet leg portion or the supply leg portion includes a female iron pipe (FIP) union for coupling to a pipe nipple or a male flare union for coupling to a fluid hose with a flare connection.

10. A tamper-proof fluid sediment trap, comprising:
a central body portion having a central longitudinal axis;
an outlet leg portion extending from the central body portion and configured to be operably coupled to an appliance;
a drip leg portion extending from the central body portion and defining an inwardly tapered conical shape being resistant to threading or tapping of an outer surface or an inner surface of the drip leg portion, wherein the outer surface of the drip leg portion is spiraled forming a spiraled inwardly tapered profile; and
a supply leg portion extending radially outward from the central body portion, between the outlet leg portion and the drip leg portion, and configured to be operably coupled to a fluid supply line.

11. The tamper-proof fluid sediment trap according to claim 10, wherein the central body portion, the outlet leg portion, and the drip leg portion are monolithically formed.

12. The tamper-proof fluid sediment trap of claim 10, wherein the inner surface of the drip leg portion is smooth.

13. The tamper-proof fluid sediment trap of claim 10, wherein the inner surface of the drip leg portion is textured.

14. The tamper-proof fluid sediment trap according to claim 10, wherein the central body portion, the outlet leg portion, and the supply leg portion define a flow path for gaseous fluid to flow from the supply leg portion through the central body portion and to the outlet leg portion while moisture present in the gaseous fluid drops to the drip leg portion.

15. A tamper-proof fluid sediment trap, comprising:
a central body portion having a central longitudinal axis;
an outlet leg portion extending from the central body portion and configured to be operably coupled to an appliance;
a drip leg portion extending from the central body portion and being resistant to threading or tapping of an outer surface or an inner surface of the drip leg portion, wherein the outer surface of the drip leg portion is spiraled forming a spiraled inwardly tapered profile; and
a supply leg portion extending radially outward from the central body portion, between the outlet leg portion and the drip leg portion, and configured to be operably coupled to a fluid supply line.

16. The tamper-proof fluid sediment trap according to claim 15, wherein the central body portion, the outlet leg portion, and the drip leg portion are monolithically formed.

17. The tamper-proof fluid sediment trap of claim 15, wherein the inner surface of the drip leg portion is smooth.

18. The tamper-proof fluid sediment trap of claim 15, wherein the inner surface of the drip leg portion is textured.

* * * * *